United States Patent
Aoki et al.

(10) Patent No.: US 8,277,718 B2
(45) Date of Patent: Oct. 2, 2012

(54) BIODEGRADABLE FILM OR SHEET, PROCESS FOR PRODUCING THE SAME, AND COMPOSITION FOR BIODEGRADABLE FILM OR SHEET

(75) Inventors: Kazuhiko Aoki, Osaka (JP); Yasuhiro Ikeo, Osaka (JP)

(73) Assignee: Nuclear Engineering, Ltd., Osaka-shi (JP)

( * ) Notice: Subject to any disclaimer, the term of this patent is extended or adjusted under 35 U.S.C. 154(b) by 304 days.

(21) Appl. No.: 12/281,374

(22) PCT Filed: Jul. 15, 2008

(86) PCT No.: PCT/JP2008/062761
§ 371 (c)(1),
(2), (4) Date: Sep. 2, 2008

(87) PCT Pub. No.: WO2009/075122
PCT Pub. Date: Jun. 18, 2009

(65) Prior Publication Data
US 2010/0233396 A1    Sep. 16, 2010

(30) Foreign Application Priority Data
Dec. 13, 2007  (JP) .................. 2007-322049

(51) Int. Cl.
*B29C 51/00* (2006.01)
(52) U.S. Cl. .................. 264/319; 264/171.1; 264/299
(58) Field of Classification Search .......... None
See application file for complete search history.

(56) References Cited

U.S. PATENT DOCUMENTS

| | | | | |
|---|---|---|---|---|
| 5,665,152 A * | 9/1997 | Bassi et al. | .................. | 106/145.1 |
| 5,783,126 A * | 7/1998 | Andersen et al. | ............. | 264/102 |
| 5,922,379 A * | 7/1999 | Wang | ............................ | 426/138 |
| 2010/0236972 A1* | 9/2010 | Aoki et al. | ................ | 206/524.7 |

FOREIGN PATENT DOCUMENTS

| | | |
|---|---|---|
| DE | 69630045 T2 | 6/2004 |
| JP | 6-313063 | 11/1994 |
| JP | 10-511145 | 10/1998 |
| JP | 11-198978 | 7/1999 |
| JP | 2001-288295 | 10/2001 |
| JP | 2002-512929 | 5/2002 |
| JP | 2002-371201 | 12/2002 |
| JP | 2003-105130 | 4/2003 |
| JP | 2003-292554 | 10/2003 |
| JP | 2004-339496 | 12/2004 |
| WO | 97/19988 A1 | 6/1997 |

OTHER PUBLICATIONS

Examination Report under Section 18(3) dated Oct. 8, 2008, issued in corresponding United Kingdom Patent Application No. GB0813676.4.
Germany Office Action dated May 7, 2010, issued in corresponding Germany Patent Application No. 112008000001.8-43.
Germany Office Action dated Apr. 8, 2009, issued in corresponding Germany Patent Application No. 112008000001.8-43.

* cited by examiner

*Primary Examiner* — Monica A Huson
(74) *Attorney, Agent, or Firm* — Westerman, Hattori, Daniels & Adrian, LLP

(57) ABSTRACT

The invention provides a biodegradable film or sheet having water resistance and strength sufficiently. Respective components are mixed so as to form a mixture containing 0% by mass or more and 35% by mass or less of starch, 20% by mass or more and 70% by mass or less of protein, 15% by mass or more and 60% by mass or less of cellulose fibers and 1% by mass or more and 15% by mass or less of urea, then adding 10 or more and 100 or less parts by mass of water to 100 parts by mass of the mixture, kneading the mixture sufficiently with a twin-screw mixer or the like, and rolling the kneaded product under heating at about 120° C. to give a film or sheet with several tens μm to about 300 μm in thickness.

4 Claims, No Drawings

BIODEGRADABLE FILM OR SHEET, PROCESS FOR PRODUCING THE SAME, AND COMPOSITION FOR BIODEGRADABLE FILM OR SHEET

TECHNICAL FIELD

The present invention relates to a biodegradable film or sheet that can be applied to an agricultural sheet, a garbage bag and the like, a process for producing the same, and a composition for use in the film or sheet.

BACKGROUND ART

Up to now, a large number of biodegradable films and sheets based on biodegradable resins such as polylactic acid and fatty acid polyesters and on natural materials such as starch have been proposed.

For example, Japanese Patent Application National Publication (Laid-Open) No. 10-511145-A (Patent Document 1) discloses a stretched film prepared from thermoplastic starch, a biodegradable polymer, cellulose fibers, and protein. JP 2002-371201-A (Patent Document 2) discloses a biodegradable film or sheet using a biodegradable resin such as polylactic acid, an inorganic filler such as calcium carbonate, and a water-soluble resin such as polyethylene glycol. JP 06-313063-A (Patent Document 3) discloses a biodegradable film wherein protein and a natural rubber are added as reinforcing agents to starch and a biodegradable fatty acid polyester.

JP 2003-292554-A (Patent Document 4) discloses a biodegradable film based on a biodegradable compound having active hydrogen such as starch with which a compound having an acryloyl group, urea, glycerine, and natural fibers such as cellulose are further used. JP 2003-105130-A (Patent Document 5) discloses a biodegradable film obtained from a composition prepared by crosslinking with a salt such as a calcium salt or aluminium salt, starch, urea and a compound having a carboxylic acid group such as carboxymethyl cellulose, and further adding glycerine and urea. JP 2004-339496-A (Patent Document 6) discloses a biodegradable film using starch, urea in an amount of 60 to 300% based on the starch, a polyhydric alcohol such as glycerine in an amount 10 to 150% by mass based on the starch, and natural materials such as paper or hemp fibers. JP 2001-288295-A (Patent Document 7) discloses a film using corn gluten meal, natural rubber, and urea as a plasticizer. Japanese Patent Application National Publication (Laid-Open) No. 2002-512929-A (Patent Document 8) describes a biodegradable film made of a composition containing starch, protein, natural cellulose fibers, a metal salt hydrate, and urea as a plasticizer.
Patent Document 1: Japanese Patent Application National Publication (Laid-Open) No. 10-511145-A
Patent Document 2: JP 2002-371201-A
Patent Document 3: JP 06-313063-A
Patent Document 4: JP 2003-292554-A
Patent Document 5: JP 2003-105130-A
Patent Document 6: JP 2004-339496-A
Patent Document 7: JP 2001-288295-A
Patent Document 8: Japanese Patent Application National Publication (Laid-Open) No. 2002-512929-A

DISCLOSURE OF THE INVENTION

Problem to be Solved by the Invention

However, the biodegradable films etc. described in Patent Documents 1 to 3 are expensive due to use of polymers, and from the viewpoint of biodegradability, films composed of natural materials are preferred.

In the biodegradable films described in Patent Documents 4 to 6, polyhydric alcohols including glycerine are used as the plasticizer, and thus glycerine etc. may exude during storage or during use. Accordingly, there causes a limitation to the intended use of such films, and thus these films may not be usable as wraps for foods.

The film in Patent Document 7 does not use a polyhydric alcohol such as glycerine, but the natural rubber used therein may not be completely degraded. The film in Patent Document 8 contains a metal salt and may thus bring anxiety about environmental pollution when disposed in soil as it is. In addition, this film contains urea at high concentration, thus increasing discharged nitrogen load, which possibly imposes restrictions on use of the film in agriculture.

The present invention was made in light of the background art described above, and an object of the present invention is to provide a biodegradable film or sheet sufficiently having water resistance and strength with less burden of pollutants such as a polymer, a metal salt and nitrogen to be discharged into the environment.

Means for Solving the Problem

The present inventors made an intensive effort to solve the above-described problem, and as a result, they found that a film or sheet sufficiently having water resistance and mechanical strength can be obtained from a composition consisting of 3 components that are protein, cellulose fibers and urea, or 4 components that are the 3 components plus starch which is added if necessary, and the present invention was thereby completed.

EFFECTS OF THE INVENTION

According to the present invention, a film or sheet sufficiently having water resistance and strength can be obtained. Particularly, a transparent and highly biodegradable film having strength even if it is particularly thin can be obtained. In addition, the nitrogen content of this film is lower than conventional biodegradable films. It follows that even if the film is disposed of in nature, the amount of nitrogen discharged as burden into the environment is low. Accordingly, there is provided a new material adapted to use in, for example, sheets for cold weather used in agriculture etc., and garbage bags for raw garbage generated from home.

BEST MODE FOR CARRYING OUT THE INVENTION

The composition for a biodegradable film or sheet according to the present invention comprises 0% by mass or more and 35% by mass or less of starch, 20% by mass or more and 70% by mass or less of protein, 15% by mass or more and 60% by mass or less of cellulose fibers, and 1% by mass or more and 15% by mass or less of urea, and the composition to which water was added comprises 0% by mass or more and 30% by mass or less of starch, 15% by mass or more and 60% by mass or less of protein, 10% by mass or more and 40% by mass or less of cellulose fibers, 0.75% by mass or more and 12% by mass or less of urea, and 20% by mass or more and 60% by mass or less of water.

The starch used in the present invention may be not only starch (natural starch) derived from natural products, but also chemically modified starch obtained by chemically modifying natural starch by a chemical treatment, or may be a suitable mixture thereof.

The natural starch is starch obtained from various plants, such as maize starch, potato starch, sweet potato starch, wheat starch, rice starch, tapioca starch, and sorghum starch, and the plant serving as the origin of starch is not particularly limited. A content of amylose and amylopectin contained in the starch is not particularly limited either, and starch with an increased content of amylose, such as high-amylose maize starch, may be also used. Not only single starch but also two or more kinds of natural starches may be used in the present invention.

Chemically modified starch has substituents introduced into hydroxyl groups of glucoses constituting starch. The substituents are not particularly limited, and a type of natural starch to be modified is not limited either. Examples of the chemically modified starch include hydroxypropyl starch, carboxymethyl starch, acetylated high-amylose starch, starch acetate, starch maleate, starch octenylsuccinate, starch succinate, starch phthalate, hydroxypropyl high-amylose starch, crosslinked starch, starch phosphate, and hydroxypropyldistarch phosphate. These chemically modified starches are not limited to a single type and may be used as a mixture of two or more thereof. As used herein, the crosslinked starch refers to starch having molecules crosslinked with one another by various crosslinking agents such as phosphoric acid chloride, epichlorohydrin, and phosphoric acid derivatives.

The protein used in the present invention may be either plant-derived protein or animal-derived protein or may be a synthetic protein. Examples of the plant-derived protein (plant protein) include proteins obtained from various pulses and grains, such as soy protein, wheat protein and rice protein. Examples of the animal-derived protein (animal protein) include proteins derived from various animals, birds and fishes, such as milk protein. These proteins may be not only crude proteins that were merely extracted and not purified, but also concentrated proteins that were concentrated. Examples of such proteins include concentrated soy protein in the case of the plant-derived proteins and concentrated milk protein in the case the animal-derived proteins. While the proteins may also be those purified from crude proteins, and such plant-derived proteins are exemplified by gluten, zein, hordein, avenin, and caffyrine, and the animal-derived proteins are exemplified by casein, albumin, collagen, gelatin, and keratin. These proteins may be used singly or in combination of two or more kinds thereof.

The cellulose fibers used in the present invention may be either natural or artificial cellulose fibers. Examples of the naturally derived cellulose fibers include those derived from various plants, for example seed coats of grains such as rice husks, or grasses, wood, straws, sugarcane, cotton, leaves, a husk of maize, bagasse obtained from cane trash, and processed products such as newspaper. These cellulose fibers are obtained by drying straws, seed coats of grains or the like and then loosening them in a fibrous state, and used by cutting them in an arbitrary suitable length. A cellulose fiber that can be used in the present invention is about 1 to 100 μm in thickness and about 10 μM to 30 mm in length, and can be suitably determined depending on the intended use and required strength of their processed product.

The composition of the present invention contains protein, cellulose fibers and urea as essential components wherein the protein is contained in an amount of 20% by mass or more and 70% by mass or less, the cellulose fibers in an amount of 15% by mass or more and 60% by mass or less, and urea in an amount of 1% by mass or more and 15% by mass or less, based on the composition, and when starch is used, starch is contained in an amount of 0% by mass or more and 35% by mass or less based on the composition. This composition refers to a composition in a state before water addition as described later, wherein it is assumed to use the respective materials that have been stored in an ordinary state without carrying out a special drying treatment or wet treatment.

A biodegradable sheet-like product can also be obtained from 3 components that are, for example, protein, cellulose fibers and starch other than the composition of the present invention. However, this sheet-like product is as thick as a film and has little flexibility and stretchability. During storage, this sheet-like product is dried, easily damaged and broken. In these circumstances, the present inventors found that by adding urea to a composition having a specific compounding ratio, a flexible sheet-like film not only having strength but also improving water retention characteristics can be formed. At this time, the composition cannot be formed into a film when protein is incorporated in an amount of lower than 20% by mass, or higher than 70% by mass in the composition. When the amount of cellulose fibers incorporated is lower than 15% by mass, the composition cannot be formed into a film either, and when the amount of cellulose fibers incorporated is higher than 60% by mass, the amount of the cellulose fibers incorporated is too large relative to the amount of the protein, thus resulting in failure of the composition to form a good film as with the case where the amount of cellulose fibers incorporated is too low. Urea is an essential component that is very important for the composition of the present invention. This urea, rather than serving as a plasticizer in a film composed of a synthetic polymer, functions in retaining water in the obtained film, thereby conferring flexibility on the film. Accordingly, the amount of urea incorporated into the composition in at least a state to which water is not added is to be 1% by mass or more, preferably 2% by mass or more. On the other hand, the amount of urea is preferably lower in order to reduce nitrogen load on the environment, and therefore, the amount of urea in the composition is 15% by mass or less, preferably 12% by mass or less, more preferably less than 5% by mass. That is, the amount of urea incorporated is 1 to 15% by mass, preferably 2 to 12% by mass.

In the present invention, starch is a component that is not essential but optional, and is appropriately incorporated as necessary. The amount of starch incorporated into the composition is 35% by mass or less. The film obtained from the composition of the present invention is obtained by well-balanced incorporation of protein, cellulose fibers and urea, wherein starch is considered as a filler (extender). Accordingly, formation of a suitable film is made infeasible as the amount of starch incorporated into the composition is increased to fail to attain the well-balanced incorporation of the 3 components that are protein, cellulose fibers and urea.

The biodegradable composition of the present invention contains protein, cellulose fibers and urea as essential components to which starch is added as an additional component, and does not necessitate blending with other components such as a plasticizer such as glycerin or polyethylene glycol, a softener, and a metal salt. As a matter of course, additives such as a coloring agent and a stabilizer for prevention of thermal coloration may be incorporated into the biodegradable composition as long as physical properties of the processed product of the present invention, such as strength and flexibility, are not essentially changed.

The film or the like of the present invention can be produced in the following manner. That is, the necessary components are mixed well with water and then sufficiently kneaded. That is, the above-described components are mixed in predetermined compounding amounts, followed by adding water, and sufficient kneading under stirring with a twin-screw mixer or the like. At this time, mere mixing of the respective components with water is insufficient, and the components are sufficiently kneaded until hardness similar to that of an earlobe, preferably firmness of a noodle, is attained.

In this case, the mixing ratio of water to the composition is established such that 10 parts by mass or more and 100 parts by mass or less of water, preferably 25 parts by mass or more and 70 parts by mass or less of water, are mixed with respect to 100 parts by mass of the composition, but the mixing ratio is suitably adjusted such that the hardness described above can be attained. When the amount of water is less than 10 parts by mass, the composition is made gritty and cannot be sufficiently kneaded, while when the amount of water is higher than 100 parts by mass, water is so large in quantity that suitable firmness cannot be obtained in many cases. The composition having water added to starch, protein, cellulose fibers and urea is allowed to contain water in an amount of preferably 20% by mass or more and 60% by mass or less, more preferably 28% by mass or more and 52% by mass or less.

The resulting kneaded material is processed directly into a film or sheet for example. For formation into a film or sheet, the kneaded material may be pressed where rolling processing, so-called calendering or rolling is preferably used.

A heat treatment is carried out during pressing. The heat treatment is carried out at a temperature of 100° C. or more and about 135° C. that is the degradation temperature of urea or less, that is, in the range of 100 to 135° C., more preferably 110 to 130° C. When the temperature is low, sufficient strength and transparency cannot be attained, while when the temperature is high, the resulting film is discolored to turn brown and reduces water therein, thus often giving a product that is more a plate absent in flexibility than a film. The pressure and time during pressing are suitably determined depending on formulation of the composition and the thickness of a film desired and are for example about 5 MPa and about 5 minutes respectively when the temperature is 120° C. However, a film or sheet having suitable strength and water resistance can be obtained by pressing at ordinary temperature without heating.

In the present invention, the urea-containing film or sheet obtained from the composition of the present invention is excellent in water retention characteristics. An intermediate product obtained by kneading the composition of the present invention to which water was added also has water retention characteristics, and after storage in a moisturized state, the intermediate product can be processed into a film or the like. That is, a composition consisting of the 3 or 4 components described above can be sufficiently kneaded with water and provided as the composition of the present invention. This composition provided as an intermediate product contains 0% by mass or more and 30% by mass or less of starch, 15% by mass or more and 60% by mass or less of protein, 10% by mass or more and 40% by mass or less of cellulose, 0.75% by mass or more and 12% by mass or less of urea, and 20% by mass or more and 60% by mass or less of water, wherein the amount of urea is preferably 1% by mass or more and 10% by mass or less. As used herein, "storage in a moisturized state" means a state of substantial absence in evaporation of water from the kneaded composition, and is exemplified by storage in a plastic bag, for example. However, it is not always necessary that the environment in which the composition is stored be kept highly humid.

The film or sheet obtained from the composition of the present invention is several tens μm to about 300 μm in thickness or can also be provided as a sheet-like product having a thickness of about 0.5 to 2 mm.

The film or the like of the present invention is transparent to translucent and is resistant to water for about 1 week in a state dipped in water when the film thickness is 200 μm, or for 3 weeks or more when the film thickness is 1 mm. The film or the like of the present invention has a tensile strength of at least about 10 to 30 MPa. This product does not use a plasticizer such as an oil, wax or glycerin, thus serving as a film or sheet excellent in safety to a living body, without exuding such chemicals therefrom. In addition, this product does not use a metal salt either and will thus not discharge a metal salt upon degradation and will, because of its low urea content, releases less nitrogen to the environment, thus reducing concern about environmental pollution such as nutrient enrichment.

It goes without saying that the film or sheet of the present invention may be used as wrapping or packaging sheets for food which are not subjected to any secondary processing, or may be subjected to secondary processing into bags such as packaging and preserving bags for food and provided in various forms of garbage bags, shopping bags, and the like. The method of processing the film or sheet into a bag includes a method of processing it into a bag by using an adhesive consisting of the same composition as that of the sheet as the starting material and a method of increasing pressure in the portion of pressure bonding under heating.

A sheet-like product having not only sufficient water resistance but also high strength can be obtained from the composition of the present invention. Accordingly, the composition of the present invention may be used not only in a film or sheet, but also in tableware such as a cup or dish, a lunch box and a takeout packaging container. In this case, the sufficiently kneaded composition may be pressed in a predetermined shape under heating to the temperature mentioned above. If necessary, the product may be coated with a water-resistant resin.

Hereinafter, the present invention is described in more detail by reference to Examples. As a matter of course, the present invention is not limited to the following examples.

EXAMPLE 1

First, those compositions containing starch, protein, cellulose fibers and urea were evaluated for their mixing/press performance and their thin film-forming ability.

Maize starch (manufactured by Wako Pure Chemical Industries, Ltd.), potato starch (manufactured Wako Pure Chemical Industries, Ltd.), rice starch (manufactured Wako Pure Chemical Industries, Ltd.), wheat starch (manufactured Wako Pure Chemical Industries, Ltd.), wheat protein ("Fumeritt A" manufactured by the Nagata Group), cellulose fibers (KC Flock #100 mesh or #200, manufactured by Nippon Paper Chemicals), and urea were compounded as shown in Table 1, then water was added in an amount shown in Table 1, and these components were mixed and kneaded by using a twin-screw mixer at ordinary temperatures. Formation of the resulting kneaded product into a film was attempted under heating at 120° C. with a twin-screw pressing machine. At this time, the kneaded product was evaluated for its mixing/press performance and for its thin film-forming ability. The results are shown in Table 1. The mixing/press performance was evaluated by examining whether or not the composition could be sufficiently kneaded with water, and the thin film-forming ability was evaluated by examining whether a film could be obtained or not. Table 2 shows the formulation of each composition to which water was added.

TABLE 1

| Test No. | Components(parts by mass) | | | | | | | Water(mass part) based on 100 parts of composition | Mixing/press performance | Thin film-forming ability, Flexibility |
| --- | --- | --- | --- | --- | --- | --- | --- | --- | --- | --- |
| | Starch | | | | Protein | Cellulose | Urea | | | |
| | maize | potato | rice | wheat | | | | | | |
| 1 | 0.0 | — | — | — | 100.0 | 0.0 | 0.0 | 52.2 | x | — |
| 25 | 0.0 | — | — | — | 50.0 | 50.0 | 0.0 | 50.0 | ○ | x |
| 26 | 0.0 | — | — | — | 41.7 | 58.3 | 0.0 | 41.7 | ○ | x |
| 27 | 0.0 | — | — | — | 40.0 | 60.0 | 0.0 | 56.0 | ○ | x |
| 49 | 0.0 | — | — | — | 28.6 | 71.4 | 0.0 | 71.4 | ○ | x |
| 50 | 0.0 | — | — | — | 23.1 | 76.9 | 0.0 | 61.5 | ○ | x |
| 24 | 0.0 | — | — | — | 90.1 | 9.0 | 0.9 | 36.0 | ○ | x |
| 23 | 0.0 | — | — | — | 89.3 | 8.9 | 1.8 | 35.7 | ○ | x |
| 18(4) | 0.0 | — | — | — | 65.4 | 32.7 | 2.0 | 29.4 | ○ | ○ |
| 37(4) | 21.6 | — | — | — | 43.8 | 32.7 | 2.0 | 32.7 | ○ | ○ |
| 18(3) | 0.0 | — | — | — | 64.7 | 32.4 | 2.9 | 29.4 | ○ | ○ |
| 37(3) | 21.4 | — | — | — | 43.4 | 32.4 | 2.9 | 32.4 | ○ | ○ |
| 45 | 21.3 | — | — | — | 43.2 | 32.3 | 3.2 | 32.3 | ○ | ○ |
| 18(2) | 0.0 | — | — | — | 64.0 | 32.0 | 4.0 | 32.0 | ○ | ○ |
| 37(2) | 21.1 | — | — | — | 42.9 | 32.0 | 4.0 | 32.0 | ○ | ○ |
| 22 | 0.0 | — | — | — | 87.0 | 8.7 | 4.3 | 34.8 | ○ | x |
| 44 | 20.6 | — | — | — | 41.9 | 31.3 | 6.3 | 31.3 | ○ | ○ |
| 43 | 24.4 | — | — | — | 49.6 | 18.5 | 7.4 | 29.6 | ○ | ○ |
| 41 | 12.2 | — | — | — | 24.8 | 55.6 | 7.4 | 51.9 | ○ | ○ |
| 19 | 0.0 | — | — | — | 37.0 | 55.6 | 7.4 | 51.9 | ○ | ○ |
| 21 | 0.0 | — | — | — | 83.3 | 8.3 | 8.3 | 33.3 | ○ | x |
| 40 | 15.0 | — | — | — | 30.5 | 45.5 | 9.1 | 40.9 | ○ | ○ |
| 17 | 11.1 | — | — | — | 55.6 | 22.2 | 11.1 | 27.8 | ○ | ○ |
| 16 | 5.9 | — | — | — | 58.8 | 23.5 | 11.8 | 29.4 | ○ | ○ |
| 18 | 0.0 | — | — | — | 58.8 | 29.4 | 11.8 | 29.4 | ○ | ○ |
| 36 | 5.9 | — | — | — | 52.9 | 29.4 | 11.8 | 29.4 | ○ | ○ |
| 37 | 19.4 | — | — | — | 39.4 | 29.4 | 11.8 | 29.4 | ○ | ○ |
| 38 | — | 19.4 | — | — | 39.4 | 29.4 | 11.8 | 29.4 | ○ | ○ |
| 39 | — | — | 19.4 | — | 39.4 | 29.4 | 11.8 | 29.4 | ○ | ○ |
| 100 | — | — | — | 19.4 | 39.0 | 29.4 | 11.8 | 29.4 | ○ | ○ |
| 48 | 29.4 | — | — | — | 29.4 | 29.4 | 11.8 | 29.4 | ○ | ○ |
| 51 | 51.8 | — | — | — | 7.1 | 29.4 | 11.8 | 29.4 | x | — |
| 15 | 0.0 | — | — | — | 66.7 | 20.0 | 13.3 | 26.7 | ○ | ○ |
| 35 | 6.9 | — | — | — | 62.1 | 17.2 | 13.8 | 34.5 | ○ | ○ |
| 14 | 0.0 | — | — | — | 76.9 | 7.7 | 15.4 | 30.8 | ○ | x |

TABLE 2

| Test No. | Components(parts by mass) | | | | | | | | Mixing/press performance | Thin film-forming ability, Flexibility |
| --- | --- | --- | --- | --- | --- | --- | --- | --- | --- | --- |
| | Starch | | | | Protain | Cellulose | Urea | Water | | |
| | maize | potato | rice | wheat | | | | | | |
| 1 | 0.0 | — | — | — | 65.7 | 0.0 | 0.0 | 34.3 | x | — |
| 25 | 0.0 | — | — | — | 33.3 | 33.3 | 0.0 | 33.3 | ○ | x |
| 27 | 0.0 | — | — | — | 25.6 | 38.5 | 0.0 | 35.9 | ○ | x |
| 26 | 0.0 | — | — | — | 29.4 | 41.2 | 0.0 | 29.4 | ○ | x |
| 49 | 0.0 | — | — | — | 16.7 | 41.7 | 0.0 | 41.7 | ○ | x |
| 50 | 0.0 | — | — | — | 14.3 | 47.6 | 0.0 | 38.1 | ○ | x |
| 24 | 0.0 | — | — | — | 66.2 | 6.6 | 0.7 | 26.5 | ○ | x |
| 23 | 0.0 | — | — | — | 65.8 | 6.6 | 1.3 | 26.3 | ○ | x |
| 18(4) | 0.0 | — | — | — | 49.3 | 24.6 | 1.5 | 24.6 | ○ | ○ |
| 37(4) | 16.3 | — | — | — | 33.0 | 24.6 | 1.5 | 24.6 | ○ | ○ |
| 18(3) | 0.0 | — | — | — | 48.9 | 24.4 | 2.2 | 24.4 | ○ | ○ |
| 37(3) | 16.1 | — | — | — | 32.8 | 24.4 | 2.2 | 24.4 | ○ | ○ |
| 45 | 16.1 | — | — | — | 32.7 | 24.4 | 2.4 | 24.4 | ○ | ○ |
| 18(2) | 0.0 | — | — | — | 48.5 | 24.2 | 3.0 | 24.2 | ○ | ○ |
| 37(2) | 18.0 | — | — | — | 32.5 | 24.2 | 3.0 | 24.2 | ○ | ○ |
| 22 | 0.0 | — | — | — | 64.5 | 6.5 | 3.2 | 25.8 | ○ | x |
| 44 | 15.7 | — | — | — | 31.9 | 23.8 | 4.8 | 23.8 | ○ | ○ |
| 41 | 8.0 | — | — | — | 16.3 | 36.6 | 4.9 | 34.1 | ○ | ○ |
| 19 | 0.0 | — | — | — | 24.4 | 36.6 | 4.9 | 34.1 | ○ | ○ |
| 43 | 18.9 | — | — | — | 38.3 | 14.3 | 5.7 | 22.9 | ○ | ○ |
| 21 | 0.0 | — | — | — | 62.5 | 6.3 | 6.3 | 25.0 | ○ | x |
| 40 | 10.6 | — | — | — | 21.6 | 32.3 | 6.5 | 29.0 | ○ | ○ |
| 17 | 8.7 | — | — | — | 43.5 | 17.4 | 8.7 | 21.7 | ○ | ○ |
| 16 | 4.5 | — | — | — | 45.5 | 18.2 | 9.1 | 22.7 | ○ | ○ |

TABLE 2-continued

| Test No. | Components(parts by mass) | | | | | | | | Mixing/ press performance | Thin film-forming ability, Flexibility |
|---|---|---|---|---|---|---|---|---|---|---|
| | Starch | | | | Protain | Cellulose | Urea | Water | | |
| | maize | potate | rice | wheat | | | | | | |
| 18 | 0.0 | — | — | — | 45.5 | 22.7 | 9.1 | 22.7 | ○ | ○ |
| 36 | 4.5 | — | — | — | 40.9 | 22.7 | 9.1 | 22.7 | ○ | ○ |
| 37 | 15.0 | — | — | — | 30.5 | 22.7 | 9.1 | 22.7 | ○ | ○ |
| 38 | — | 15.0 | — | — | 30.5 | 22.7 | 9.1 | 22.7 | ○ | ○ |
| 39 | — | — | 15.0 | — | 30.5 | 22.7 | 9.1 | 22.7 | ○ | ○ |
| 100 | — | — | — | 15.0 | 30.5 | 22.7 | 9.1 | 22.7 | ○ | ○ |
| 48 | 22.7 | — | — | — | 22.7 | 22.7 | 9.1 | 22.7 | ○ | ○ |
| 51 | 40.0 | — | — | — | 5.5 | 22.7 | 9.1 | 22.7 | x | — |
| 35 | 5.1 | — | — | — | 46.2 | 12.8 | 10.3 | 25.6 | ○ | ○ |
| 15 | 0.0 | — | — | — | 52.6 | 15.8 | 10.5 | 21.1 | ○ | ○ |
| 14 | 0.0 | — | — | — | 58.8 | 5.9 | 11.8 | 23.5 | ○ | x |

[Strength Test]

Eight compositions excellent in mixing performance and hot press performance in Table 1 (Table 2), that is, Test Nos. 18, 18 (2) to 18 (4), 37, and 37 (2) to 37 (4), were used to prepare various films by heat pressing at 120° C. (5 MPa, 5 minutes), and the tensile strengths of these films were measured. The results are shown in Table 3.

TABLE 3

| Test No. | Components(% by mass) | | | | | Heat Treatment temperature | Physical property values(Mpa) Tensile strength | | | | |
|---|---|---|---|---|---|---|---|---|---|---|---|
| | starch | protein | cellulose | urea | water | | #1 | #2 | #3 | #4 | AVG |
| 18 | 0.0 | 45.5 | 22.7 | 9.1 | 22.7 | 120.0 | 20.8 | 21.6 | 30.4 | 21.4 | 24.2 |
| 18(2) | 0.0 | 48.5 | 24.2 | 3.0 | 24.2 | 120.0 | 34.1 | 25.8 | 26.7 | 22.4 | 27.2 |
| 18(3) | 0.0 | 48.9 | 24.4 | 2.2 | 24.4 | 120.0 | 22.4 | 22.4 | 25.0 | 17.4 | 21.8 |
| 18(4) | 0.0 | 49.3 | 24.6 | 1.5 | 24.6 | 120.0 | 18.9 | 21.5 | 27.1 | 28.3 | 23.9 |
| 37 | 15.0 | 30.5 | 22.7 | 9.1 | 22.7 | 120.0 | 12.7 | 12.3 | 18.0 | 22.0 | 16.2 |
| 37(2) | 16.0 | 32.5 | 24.2 | 3.0 | 24.2 | 120.0 | 26.5 | 25.8 | 34.9 | 16.0 | 25.8 |
| 37(3) | 16.1 | 32.8 | 24.4 | 2.2 | 24.4 | 120.0 | 8.0 | 22.5 | 26.1 | 21.2 | 19.4 |
| 37(4) | 16.3 | 33.0 | 24.6 | 1.5 | 24.6 | 120.0 | 13.9 | 13.9 | — | 9.2 | 12.3 |

[Evaluation of Water Resistance]

Then, the 8 compositions used in the strength test and the composition Test No. 36 were used to prepare various films by heat pressing at 120° C. (5 MPa, 5 minutes), and these films were evaluated for their water resistance. This evaluation was carried out by judging whether or not the composition dipped in ordinary-temperature water had maintained its original shape without swelling. The results are shown in Table 4, and it was confirmed that these films have water resistance for 7 days when the film thickness was 200 μm, or for 24 days or more when the film thickness was 1 mm. For reference, sheets obtained by press working at ordinary temperatures were also evaluated for their water resistance.

TABLE 4

| Test No. | Component(% by mass) | | | | | Low-temperature drying treatment 1 mm in thickness 30° C. | Heat Treatment 1 mm in thickness 120° C. | Heat Treatment 0.2 mm in thickness 120° C. |
|---|---|---|---|---|---|---|---|---|
| | starch | protein | cellulose | urea | water | | | |
| 18 | 0.0 | 45.5 | 22.7 | 9.1 | 22.7 | 7 days or more | 24 days or more | 7 days or more |
| 18(2) | 0.0 | 48.5 | 24.2 | 3.0 | 24.2 | 7 days or more | 24 days or more | 7 days or more |
| 18(3) | 0.0 | 48.9 | 24.4 | 2.2 | 24.4 | 7 days or more | 24 days or more | 7 days or more |
| 18(4) | 0.0 | 49.3 | 24.6 | 1.5 | 24.6 | 7 days or more | 24 days or more | 7 days or more |
| 36 | 4.5 | 40.9 | 22.7 | 9.1 | 22.7 | 7 days or more | 24 days or more | 7 days or more |
| 37 | 15.0 | 30.5 | 22.7 | 9.1 | 22.7 | 7 days or more | 24 days or more | 7 days or more |
| 37(2) | 16.0 | 32.5 | 24.2 | 3.0 | 24.2 | 7 days or more | 24 days or more | 7 days or more |
| 37(3) | 16.1 | 32.8 | 24.4 | 2.2 | 24.4 | 7 days or more | 24 days or more | 7 days or more |
| 37(4) | 16.3 | 33.0 | 24.6 | 1.5 | 24.6 | 7 days or more | 24 days or more | 7 days or more |

[Industrial Applicability]

According to the present invention, there can be provided a biodegradable film or sheet excellent in strength and water resistance never achieved until now. The film or sheet of the present invention is particularly excellent in water resistance, can be produced from only natural materials such as starch and protein without using a synthetic polymer such as polylactic acid, thus attaining high biodegradability, and can be prepared relatively inexpensively. Accordingly, the film or sheet of the present invention can be processed into a bag, and the bag into which raw garbage from home is put can be disposed of as it is. The film or sheet of the present invention is particularly low in nitrogen content and is free of a metal salt, thus reducing burden on the environment.

The invention claimed is:

1. A process for producing a biodegradable sheet or sheet, comprising the steps of:
    providing a composition consisting of:
        0% by mass or more and 35% by mass or less of starch,
        20% by mass or more and 70% by mass or less of protein,
        15% by mass or more and 60% by mass or more of cellulose fibers,
        1% by mass or more and 15% by mass or less of urea; and
        optionally a coloring agent and/or a stabilizer;
    adding water to the composition;
    kneading the composition after adding water;
    pressing the kneaded composition under heating; and
    obtaining a biodegradable film or sheet, wherein the biodegradable sheet or sheet does not include an oil, glycerin and a metal salt.

2. The process for production of a biodegradable film or sheet according to claim 1, wherein heating is carried out at 100° C. or more and 135° C. or less.

3. A process for producing a biodegradable sheet or sheet, comprising the steps of:
    providing a composition consisting of:
        0% by mass or more and 30% by mass or less of starch,
        15% by mass or more and 60% by mass or less of protein,
        10% by mass or more and 40% by mass or less of cellulose fibers,
        0.75% by mass or more and 12% by mass or less of urea,
        20% by mass or more and 60% by mass or less of water; and
        optionally a coloring agent and/or a stabilizer;
    kneading the composition,
    pressing the kneaded composition under heating; and
    obtaining the biodegradable film or sheet, wherein the biodegradable sheet or sheet does not include an oil, glycerin and a metal salt.

4. A process for producing a biodegradable sheet or sheet, comprising the steps of:
    providing a composition;
    kneading the composition;
    pressing the kneaded composition under heating; and
    obtaining a biodegradable film or sheet,
    wherein the biodegradable film or sheet consists of:
        0% by mass or more and 35% by mass or less of starch,
        20% by mass or more and 70% by mass or less of protein,
        15% by mass or more and 60% by mass or more of cellulose fibers,
        1% by mass or more and 15% by mass or less of urea; and
        optionally water, a coloring agent and/or a stabilizer,
    wherein the biodegradable sheet or sheet does not include an oil, glycerin and a metal salt.

* * * * *